W. Wickersham,
Machine for Cutting Nails,
No. 2,143, Reissued Jan. 2, 1866,
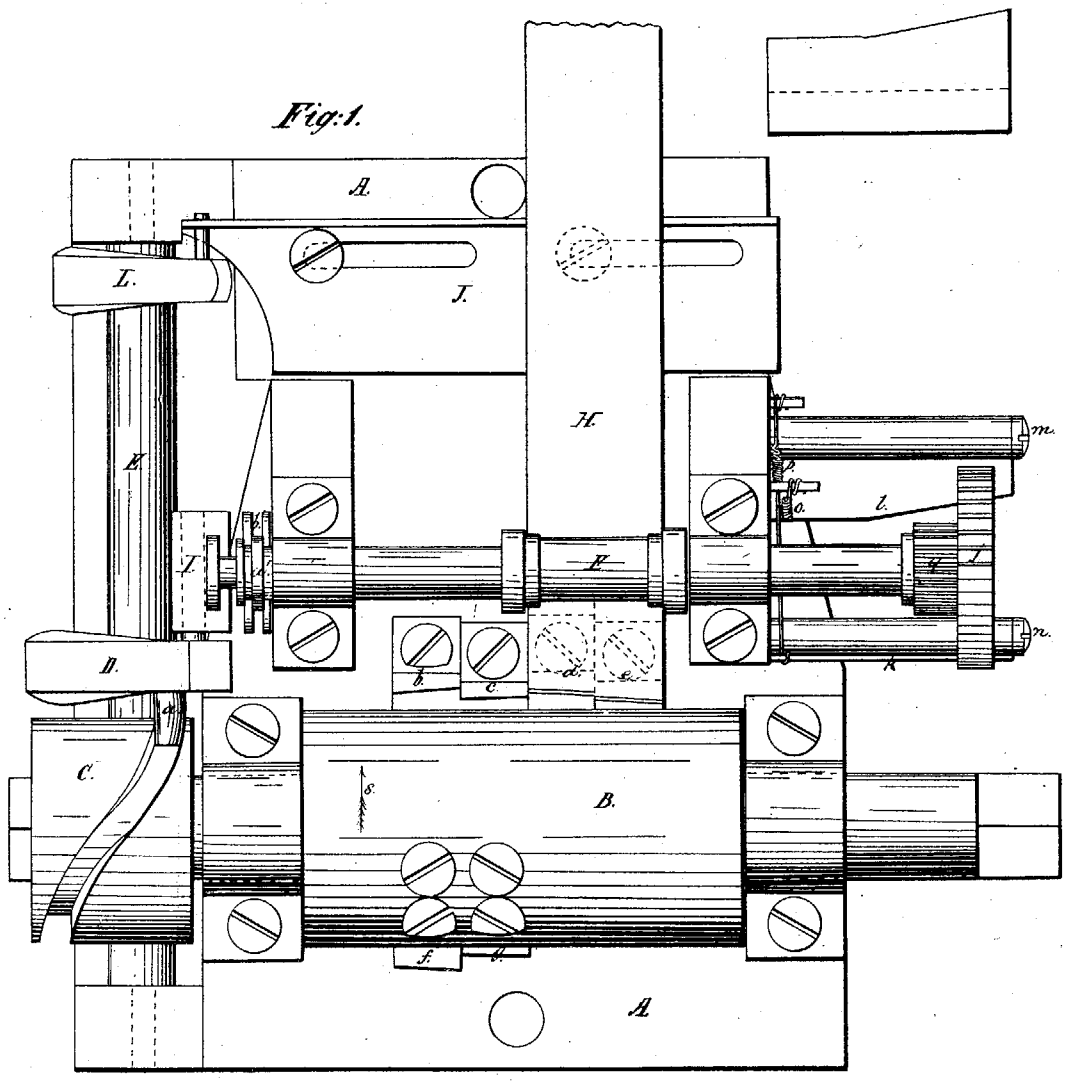
Witnesses.
N. C. Lombard
Jno. C. Hibbard
Inventor:
William Wickersham.
N. PETERS, PHOTO-LITHOGRAPHER, WASHINGTON, D. C.

W. Wickersham,
Machine for Cutting Nails,
No. 2,143, Reissued Jan. 2, 1866.
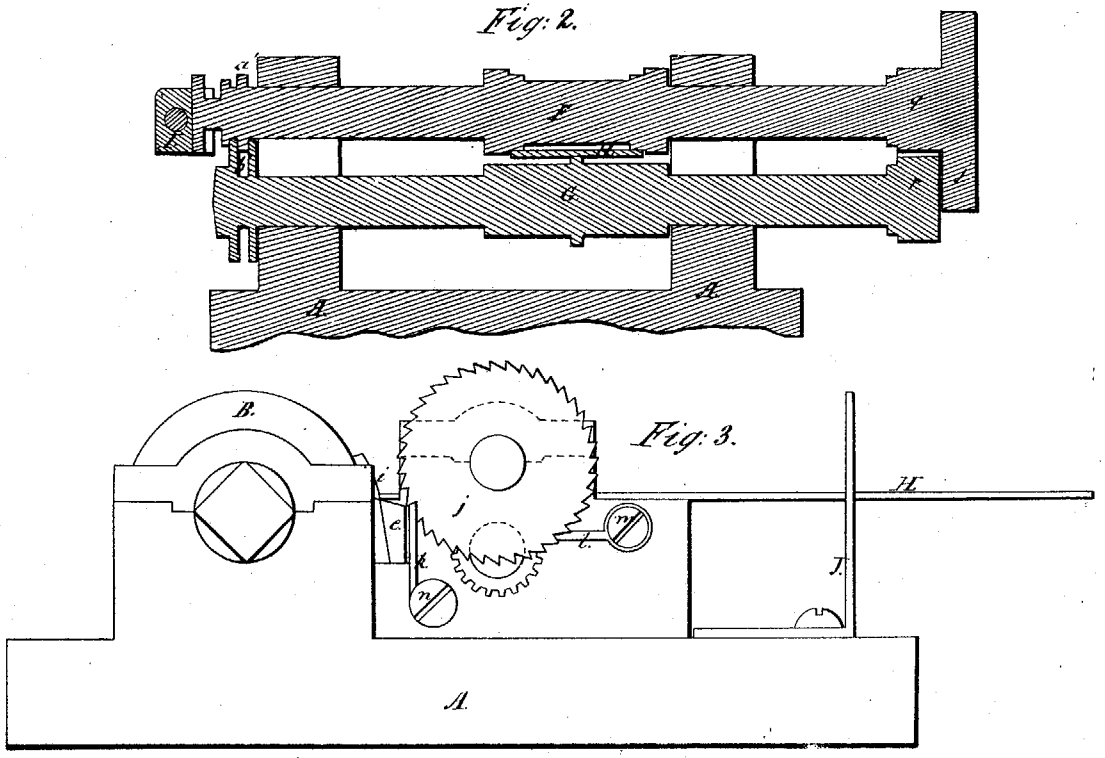
Witnesses.
N. C. Lombard.
Wm. C. Hibbard.
Inventor.
William Wickersham
N. PETERS, PHOTO-LITHOGRAPHER, WASHINGTON, D. C.

W. Wickersham,
Machine for Cutting Nails,
No. 2,143, Reissued Jan. 2, 1866.
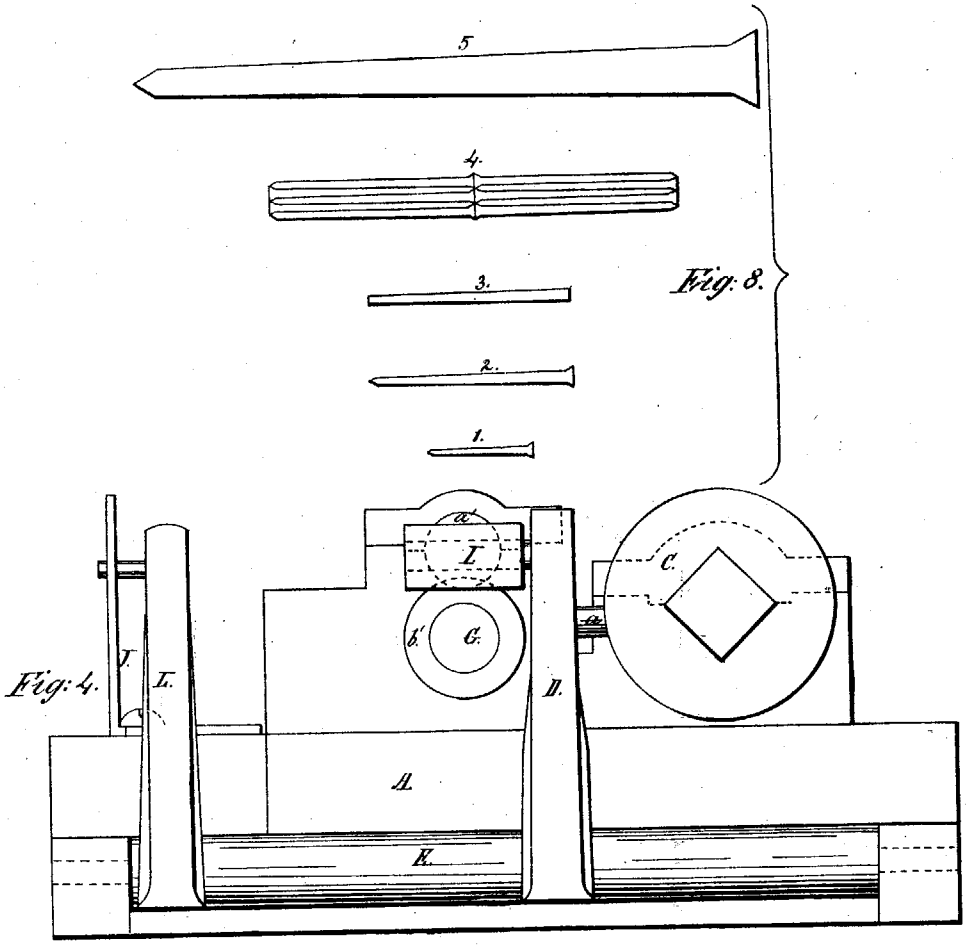
Witnesses:
N. C. Lombard.
Wm. C. Hibbard.
Inventor:
William Wickersham.
N. PETERS, PHOTO-LITHOGRAPHER, WASHINGTON, D. C.

W. Wickersham,
Machine for Cutting Nails,
No. 2,143, Reissued Jan. 2, 1866.
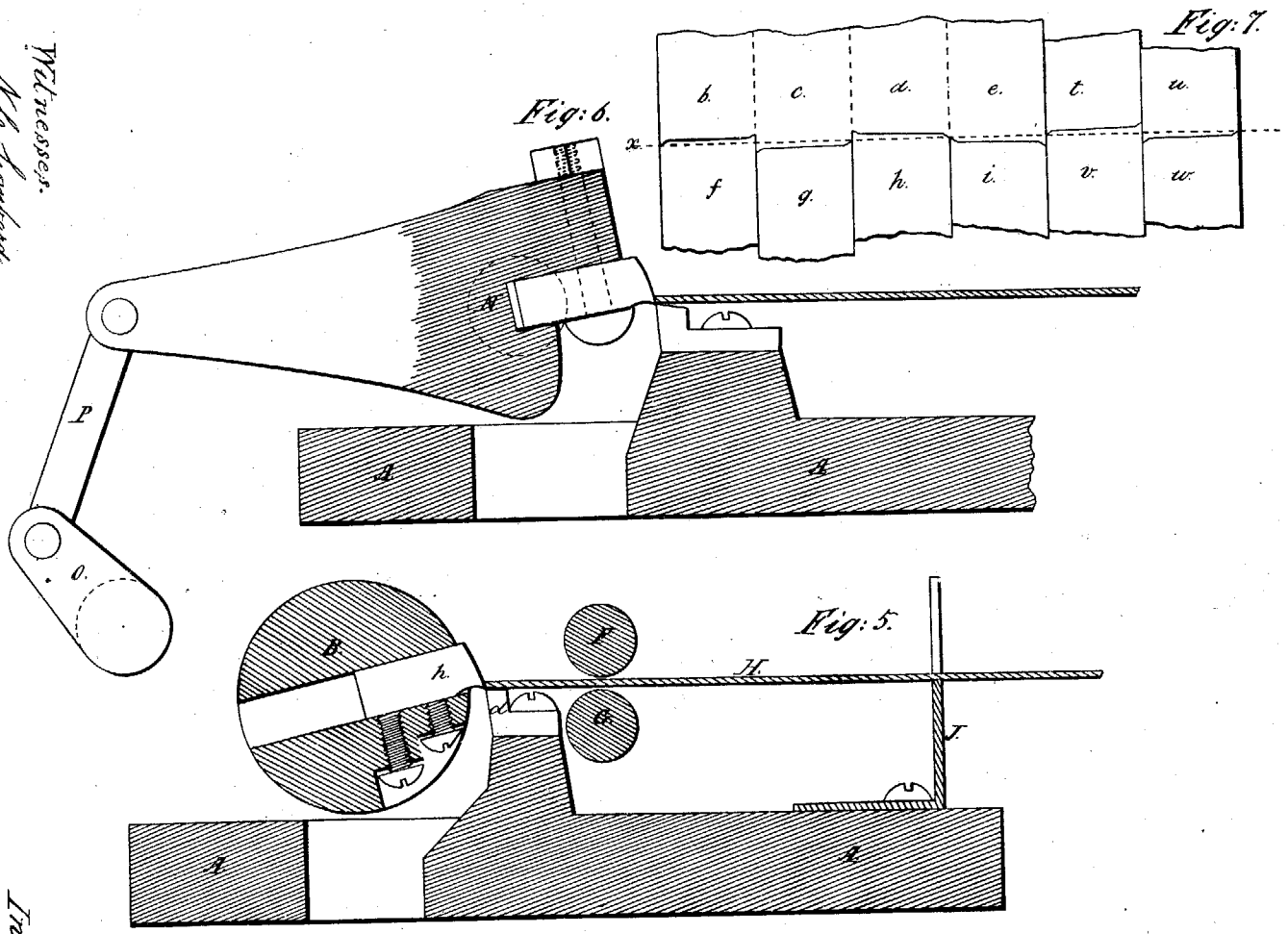
Witnesses.
N. C. Lombard.
Wm. C. Hibbard
Inventor:
William Wickersham
N. PETERS, PHOTO-LITHOGRAPHER, WASHINGTON, D. C.

UNITED STATES PATENT OFFICE.

WILLIAM WICKERSHAM, OF BOSTON, MASSACHUSETTS.

IMPROVED MACHINE FOR CUTTING NAILS.

Specification forming part of Letters Patent No. 28,928, dated June 26, 1860; Reissue No. 2,143, dated January 2, 1866.

*To all whom it may concern:*

Be it known that I, WILLIAM WICKERSHAM, of Boston, in the county of Suffolk and State of Massachusetts, have invented certain new and useful Improvements in the Nail-Cutting Machine; and I do hereby declare that the following is a full, clear, and exact description of the same, reference being had to the annexed drawings, making a part of this specification, in which—

Figure 1 is a top view of my machine, showing the cylinder containing the revolving cutters, the cam to shift the sheet of metal from one set of cutters to another, the bed-cutters, feed-motion, &c. Fig. 2 is a transverse sectional elevation of the feed-rolls which feed the sheets of metal into the machine to be cut into nails. Fig. 3 is an end view of said machine. Fig. 4 shows the opposite end to Fig. 3. Fig. 5 is a perpendicular sectional view passing through the sheet of iron and parallel to the length of it, showing the bed-piece, the cylinder with one of its cutters, one of the bed-cutters, and the two feed-rolls. Fig. 6 is a sectional view, similar to Fig. 5, of a machine differently arranged. Fig. 7 shows the plan of arranging the bed-cutters relatively to the moving cutters. Fig. 8 shows the form of the nails made, and the order in which they are cut from a wide sheet of metal.

By my said invention several nails are cut at each operation by pairs of movable and stationary cutters across the width of a sheet of metal, the length of the nails being formed in the direction of the width of the sheet, and in cutting off one series of the nails the edge of the sheet is left of a form representing one edge of the next series, and after each cutting operation the sheet of metal is advanced toward the cutters a distance sufficient to give the width of one nail, and moved laterally, so that each section of the width of the sheet equal to the length of a nail shall be moved from the pair of cutters that formed one edge of a nail to the pair which forms the other edge thereof.

In the following description of my machine I shall, for distinction, call the stationary cutter and the movable cutter that co-operates with it to cut one side of a nail a "pair of cutters," each of which in the machine represented is a separate piece of metal, although the several cutters that are placed side by side might all be formed in a single piece of metal instead.

The first feature of my invention consists in so arranging the several pairs of cutters that the next pair but one from any pair in the range shall be the reverse thereof to form the opposite side of the nail.

The second part of my invention relates to an arrangement of the pairs of cutters, so that in cutting several nails in the width of the sheet of metal there shall be no conflict in the cutting of the nails from the several columns at one and the same operation, as would be the case if they were all cut in one straight line extending across the width of the plate; and this part of my invention consists in placing each alternate pair of cutters in advance of the others in the plane of the sheet of metal, or farther from the axis of the movable cutters than the others—a distance at least equal to the width of a nail—so that the nails are cut in two lines or ranks across the sheet. By this arrangement the heads and points of the several nails cut at any one operation are not required to be severed from each other at the time they are so cut from the sheet of metal.

The third feature of my invention relates to the manner of arranging the cutters with reference to the lateral movement given to the sheet of metal to transfer any section of its width from the pair of cutters that forms one edge of a nail to the co-operating pair that forms the other edge of the same nail; and it consists in employing a continuous breadth of cutters, whether movable or stationary, sufficient to extend entirely across the sheet, added to the extent of lateral motion given to the sheet, whether that breadth be made up of several detached sections placed side by side or formed of a single piece of metal.

The fourth feature of my said invention consists in making the cutters, both movable and stationary, in separate and detached sections placed side by side, so that each series shall in its operation act as a continuous broad cutter, as if formed of a single piece of metal, in order to facilitate the placing of some of them in advance of others, as before stated, and also for the convenience of making, repairing, grinding, and adjusting them; and the fifth feature of my said invention consists in combining with a series of cutters, arranged as described, a mechanism for holding the sheet of metal while being cut, and for moving it, after each cutting action, toward the cutters a distance sufficient to give the proper width to the nail, and laterally to shift each section of the sheet from the pair of cutters that form one edge of a nail to the pair which is to form the other edge of the same nail.

In describing my machine the same letters will designate the same parts in the different drawings, in which A represents the cast-iron bed or table to which the machinery is attached. B is the cylinder which contains the rotary cutters. C is a cam upon its shaft, which moves the arm D on the shaft or axle E by means of the pin *a*. F and G are two rolls to feed the sheet of metal H into the machine as it is being cut into nails. I is a connection of the arm D with the feed-rolls F and G. J is a slide moving with the feed-rolls, and supporting one end of the sheet H, so as to keep its position in one place parallel to its position in other places. *b*, *c*, *d*, and *e* are four bed-cutters secured to the bed of the machine, and so arranged that the rotary cutters *f g h i* will come close to their edges as the cylinder B turns round. *k* and *l* are two plates of metal, having one edge of each bent round, so as to fit onto the rods or studs *m* and *n*. The other edge is made to incline at one end toward said rod, and to fit into the notches of the ratchet *j*. *o* is a spring to keep the plate *k* in the notches of the ratchet *i*. *p* is a spring to keep the plate *l* in the ratchet.

Having designated the different parts of my machine, I will now explain its operation. Supposing the different parts of the said machine to be in the positions indicated by the drawings, the sheet of iron or other metal, H, is placed between the feed-rolls F and G, as shown in Fig. 1. When the sheet H is thus placed, the cylinder B is turned in the direction indicated by the arrow-point *s*, by means of which the cutters *h* and *i* are brought onto the metallic sheet H in such manner that the revolving cutter *h*, as the cylinder B turns, will cut off a nail from said sheet by passing through it, and close by the edge of the bed-cutter *d* to cut the side of the nail, and close by the end edge of the cutter *e* to make the end of the nail. Immediately after the cutter *h* cuts the sheet the cutter *i* cuts off a nail by merely cutting the metal from one end to the other of the nail, as the part of the metal was previously cut off which forms the end of the nail. By turning the cylinder B half round in the same direction the edge of the cutter *g* comes down to and passes close by the edge of the bed-cutter *c*, and also the edge of the cutter *f* passes close by the bed-cutter *b*; but in the meantime the cam C, being fastened upon the same shaft as the cylinder B, has turned half round, and through the medium of the pin *a*, the arm D, and the connection I has moved the feed-rolls F and G longitudinally, so as to carry the nail-sheet the distance of the width of two cutters—that is, from its position in the drawings immediately over the bed-cutters *d* and *e* to a position immediately over the bed-cutters *b* and *c*—and its position when moved is kept parallel with its first position by means of the slide J, which is moved by the arm L, which is on the same shaft, E, with the arm D, so that when the cutters *f* and *g* pass by the bed-cutters *b* and *c*, as above described, they cut off two nails from the sheet H. But while the nail-sheet H is moved from the position *d* and *e* to that of *b* and *c* it is also moved toward the cylinder B by means of the feed-rolls F and G turning or rolling together, while they are kept sufficiently close on each side of the sheet H as to grip it and move it as they turn. Said feed-rolls are caused to work together by means of the two gears *q* and *r* on their ends, and the collars *a'* and *b'* working into each other. Outside of the gear *q* on the feed-roll F is a ratchet, *j*. The two plates *k* and *l* are arranged so that they will freely turn on their studs *m* and *n* by having one edge bent round the stud, and the other edge of each to work in the teeth of the ratchet. One of these plates, *l*, has the edge which works in the ratchet-teeth inclined toward the stud at the end from the machine—that is, the end of said plate from the machine is as much narrower than the end next to it as the width of a tooth in the ratchet, so that when the feed-rolls are moved from the position shown in the drawings, so as to carry the nail-sheet H over the cutters *b* and *c*, one of the teeth of the ratchet *j* is caused to slip along on the edge of the inclined plate *l* from the narrowest end to the widest, thereby causing the ratchet to turn the distance of one tooth, which causes the feed-rolls to feed the nail-sheet in toward the cutters far enough for the width of a nail. In like manner, after the nail-sheet has been moved to the position just described, and two nails been cut from it, as the cylinder B continues to turn one tooth of the ratchet is caused to slip along on the edge of the plate *k* from the narrowest to the widest end, and thereby causing said ratchet, as it moves out from the machine, to turn round one tooth, causing the feed-rolls to feed the nail-sheet in toward the cutters far enough for the width of a nail, when two more nails are cut, as above described. The middle of the edges of the cutters *c* and *e* should be the same distance from the cylinder B; also, the middle of the edges of the cutters *b* and *d* should be the same distance from the cylinder B; but the cutters *b* and *d* should be enough farther from the cylinder B than the cutters *c* and *e* to allow the cutters *f* and *h* to cut the metal off which forms one of the nails cut off by the cutters *g* and *i*, as shown in the drawings, when the sheet of metal is only wide enough for the length of two nails; but when the machine is extended so as to admit a sheet wide enough for the length of many nails, each alternate cutter in the cylinder is extended, as seen at *f*, *h*, and *v*, Fig. 7, so that the cutting-edge of each is farther from the center of said cylinder than the intermediate cutters, and the cutters thus extended cut off the metal at the heads of all the nails which the machine cuts, except the heads of those at the edge of the sheet. In this manner a broad sheet of metal may be cut into nails without first being cut into strips. It will be seen that the edge of each cutter is a little inclined to the axis of the cylinder B. This is to make the taper of the nail. The part of the sheet of metal which is cut off even with the edge of the cutter *e* is carried to the cutter *c*, the edge of which has the same inclination to the cylinder as the cutter *e*, but in an opposite direction, so that one-half of the taper of the nail is made by the cutter which cuts off each side of it. At Fig. 6 is a sectional view of a machine arranged in some respects differently from that shown at Fig. 5. Instead of the moving cutters being fixed in a revolving cylinder, they are placed in the end of lever N, which has a vibratory movement, and turns on the fulcrum or bearing indicated by the dotted circular line about the letter N. This motion is given to the lever by the crank O through the connection-rod P or any other suitable means. In this machine the bed-cutters are arranged as shown at *b c d e t u*, Fig. 7, and the movable cutters *f g h i v w* are fastened in the lever N, and are made to match them. The dark or shaded part, which covers over the bed-cutters *b*, *c*, *d*, and *e*, represents the metallic sheet off of which has been cut a series of four nails by the cutters *f g h i*. On the raising up of the moving cutters the said sheet is moved laterally in the direction of the dotted line *x*, till it is over the bed cutters *d e t u*, and passed toward the moving cutters far enough for the width of a nail, and then the moving cutters come down, and four of them *h i v w* cut off four more nails. The cutters in the machine first described make a nail like the one shown at example 3, Fig. 8, with a square point and without a head; but by making the cutters as shown at Fig. 7 nails are cut of the form seen at Fig. 8, examples 1, 2, and 5. Example 4 shows how a wide sheet is cut into nails of that form.

The details of construction of this machine may obviously be much modified without departing from the principles herein set forth as constituting my improvements; but the form represented is one that I have tried with success, and I have therefore given it as an embodiment of my invention; and although I have herein stated that the sheet of metal should be moved laterally after every cut a distance equal to the length of two nails, first to one side and then to the other, I have so stated because that is the shortest distance to which it can be moved to cut nails in accordance with the mode of operation of my said invention, and to move it a greater distance would be an obvious disadvantage; but nevertheless, if there be a sufficient number of pairs of cutters, it could be moved to a greater distance, such as the length of six, ten, fourteen, or eighteen nails, and in that order to a greater distance.

Now, I do not claim, broadly, the method of forming nails by simply cutting them from a plate, nor in cutting nails from a plate, moving it alternately from one pair of cutting-dies to another pair to form the opposite sides of the nail, as that has been done before; but in no instance within my knowledge have either of the distinguishing features of my invention before described been employed in machines for cutting nails of any form.

What I claim as my invention, and desire to secure by Letters Patent, is as follows:

1. Arranging the pairs of cutters substantially as described, so that the next pair but one from any pair shall be the reverse thereof to form the opposite side of the same nail, substantially as described.

2. The placing of each alternate pair of cutters in advance of the others in the plane of the sheet of metal, or farther from the axis of the movable cutters than the others, to enable the contiguous nails in the several columns to be cut separately, substantially as described.

3. The employment of a continuous collective breadth of either movable or stationary cutters sufficient to extend entirely across the sheet added to the extent of lateral motion given to the sheet to transfer it from one set of dies to another, substantially as described.

4. Forming each series of cutters in separate sections placed side by side and otherwise arranged, substantially as set forth.

5. In combination with the series of cutters arranged and operating as described, the mechanism for holding the sheet of metal while being cut, and for moving it laterally the distance from one pair of cutters to the pair that co-operates with it, and for feeding the sheet forward a distance equal to the breadth of the nail, substantially as described.

Executed at Boston this 18th day of April, A. D. 1865.

WILLIAM WICKERSHAM.

Witnesses:

WM. C. HIBBARD,

N. C. LOMBARD.